United States Patent
McSwiggan

(10) Patent No.: US 11,663,538 B2
(45) Date of Patent: May 30, 2023

(54) SYSTEM AND METHOD FOR REAL-TIME SCHEDULING REALLOCATION

(71) Applicant: Verint Americas Inc., Alpharetta, GA (US)

(72) Inventor: Stephen McSwiggan, Scotland (GB)

(73) Assignee: Verint Americas Inc., Alpharetta, GA (US)

( * ) Notice: Subject to any disclaimer, the term of this patent is extended or adjusted under 35 U.S.C. 154(b) by 165 days.

(21) Appl. No.: 15/864,850

(22) Filed: Jan. 8, 2018

(65) Prior Publication Data

US 2019/0213526 A1    Jul. 11, 2019

(51) Int. Cl.
*G06Q 10/0631* (2023.01)
*G06Q 10/04* (2023.01)

(52) U.S. Cl.
CPC .......... *G06Q 10/063116* (2013.01); *G06Q 10/063112* (2013.01); *G06Q 10/063114* (2013.01); *G06Q 10/04* (2013.01)

(58) Field of Classification Search
CPC ....... G06Q 10/1095; G06Q 10/063116; G06Q 10/063112; G06Q 10/063114; G06Q 10/04; G06N 5/04
USPC ...................................................... 705/7.14
See application file for complete search history.

(56) References Cited

U.S. PATENT DOCUMENTS

| | | | |
|---|---|---|---|
| 6,144,971 A * | 11/2000 | Sunderman | G07C 1/10 715/205 |
| 2006/0229896 A1* | 10/2006 | Rosen | G06Q 10/1053 705/321 |
| 2007/0179829 A1* | 8/2007 | Laperi | G06Q 10/063116 705/7.22 |
| 2010/0165977 A1* | 7/2010 | McCord | H04M 3/5238 370/352 |
| 2014/0324499 A1* | 10/2014 | Placiakis | G06Q 10/063116 705/7.16 |
| 2014/0355749 A1* | 12/2014 | Conway | H04M 3/5238 379/265.1 |
| 2015/0142490 A1* | 5/2015 | Georgiades | G06Q 10/063114 705/7.15 |
| 2015/0363746 A1* | 12/2015 | Fairbanks | G06Q 10/063116 705/7.15 |
| 2018/0101809 A1* | 4/2018 | Bnayahu | G06Q 10/10 |

OTHER PUBLICATIONS

A multi-agent learning approach to online distributed resource allocation; Zhang et al. (Year: 2009).*

* cited by examiner

*Primary Examiner* — Timothy Padot
*Assistant Examiner* — Francis Z. Santiago Merced
(74) *Attorney, Agent, or Firm* — Christopher M. Scherer; Erin Ella Block; DeWitt LLP

(57) ABSTRACT

The present application includes a method and system for real-time scheduling reallocation. The system receives a schedule which allocates customer service representatives (CSRs) to channels and queues based on analytics rules as well as the forecast work patterns and information on CSR skills and shift patterns. The system then monitors adherence to the schedule by comparing the difference between forecast and current volume and type of work to a reallocation threshold at predetermined intervals. If the difference extends beyond the reallocation threshold, the system reallocates CSRs to update the schedule.

8 Claims, 4 Drawing Sheets

SYSTEM AND METHOD FOR REAL-TIME SCHEDULING REALLOCATION

FIELD

The present disclosure is directed to a method for computer analysis, specifically a method of reallocating scheduled worker resources in real-time.

BACKGROUND

In a modern high-volume customer engagement center (CEC), work often arrives at a predictable rate and with a predictable distribution in terms of type of work and skills required. Work scheduling systems can forecast the workloads and produce schedules for customer service representatives (CSRs) that efficiently manage the predicted workload. Occasionally, however, the work will arrive in unexpected volumes and/or with unexpected distribution characteristics. For example, a scheduling system for a bank may predict 100 contacts per hour, split as 70 account enquiries, 20 loan applications, and 10 mortgage applications. A sudden increase in mortgage applications to 30 per hour with a drop in account enquiries to 50 per hour would require the bank to shift CSR resources between specific areas. An abrupt spike in account enquiries to 150 per hour would require the bank to increase CSR resources to account enquiries.

CECs must rapidly react to their shifting workloads in order to properly reallocate potentially large numbers of CSRs to more appropriate work assignments. Failing to do so results in work distribution inefficiencies, contact backlogs, and customer discontent. Unfortunately, continual real-time coordination and reallocation of hundreds or potentially thousands of CSRs is practically impossible for management and human resources staff, particularly if the CSRs are spread across multiple CECs and time zones. In the case of CECs providing outsourced services supplied to multiple companies, reallocation efforts may need to account for each company's work policies and CSR requirements, adding an additional layer of complexity to reallocation efforts.

Most modern electronic scheduling programs do not have the capability to reallocate CSRs in real time. As a result, customers may face excessive wait times to engage with a CSR, reducing customer satisfaction. Uneven distribution of CSRs may lead to some CSRs having minimal client contact while others are inundated, leading to inefficient throughput and reduced CSR satisfaction. Inadequate staff rescheduling efforts may accidentally schedule CSRs in roles they are ill-equipped to handle, or violate a company's work requirements.

There is an unmet need in the art for a system and method capable of automatically reallocating scheduled CSRs in real-time as a response to shifting workloads.

SUMMARY

An exemplary embodiment of the present application is a method for real-time scheduling reallocation. The method receives a schedule allocating CSRs and monitors adherence to the schedule by calculating a difference between forecast and current volume and type of work. If the difference between forecast and current volume and type of work exceeds a reallocation threshold within the analytics rules in a Dynamic Allocation Engine (DAE), the DAE reallocates CSRs to update the schedule.

Another exemplary embodiment of the present application is a system for real-time scheduling reallocation. The system includes a processor and a non-transitory computer readable medium programmed with computer readable code that upon execution by the processor causes the processor to execute the above-mentioned method for real-time scheduling reallocation.

Another exemplary embodiment of the present application is a non-transitory computer readable medium programmed with computer readable code that upon execution by a processor causes the processor to execute the above-mentioned method for real-time scheduling reallocation.

The objects and advantages will appear more fully from the following detailed description made in conjunction with the accompanying drawings.

BRIEF DESCRIPTION OF THE DRAWING(S)

DETAILED DESCRIPTION OF THE DRAWING(S)

In the present description, certain terms have been used for brevity, clearness and understanding. No unnecessary limitations are to be applied therefrom beyond the requirement of the prior art because such terms are used for descriptive purposes only and are intended to be broadly construed. The different systems and methods described herein may be used alone or in combination with other systems and methods. Various equivalents, alternatives and modifications are possible within the scope of the appended claims. Each limitation in the appended claims is intended to invoke interpretation under 35 U.S.C. § 112, sixth paragraph, only if the terms "means for" or "step for" are explicitly recited in the respective limitation.

Dynamic allocation (DA) systems allow continual real-location of scheduled CSRs, permitting controlled, effective engagement with customers. By updating schedules in real time using a DA system, the DA system can allow an organization to achieve several key benefits. First, the DA system can be integrated with existing scheduling systems, allowing users to keep current, familiar scheduling systems. Second, the DA system will automatically update the pre-existing schedule to account for changing workloads and CSR availability, even for a large-scale, highly distributed workforce, thereby ensuring a constantly optimized schedule and reduced backlogs and customer dissatisfaction. Third, in the event that the system is unable to effectively reallocate CSRs, it will alert managerial staff that a reallocation crisis is occurring and allow them to manually override existing reallocation parameters or provide new reallocation parameters.

Figure 1:
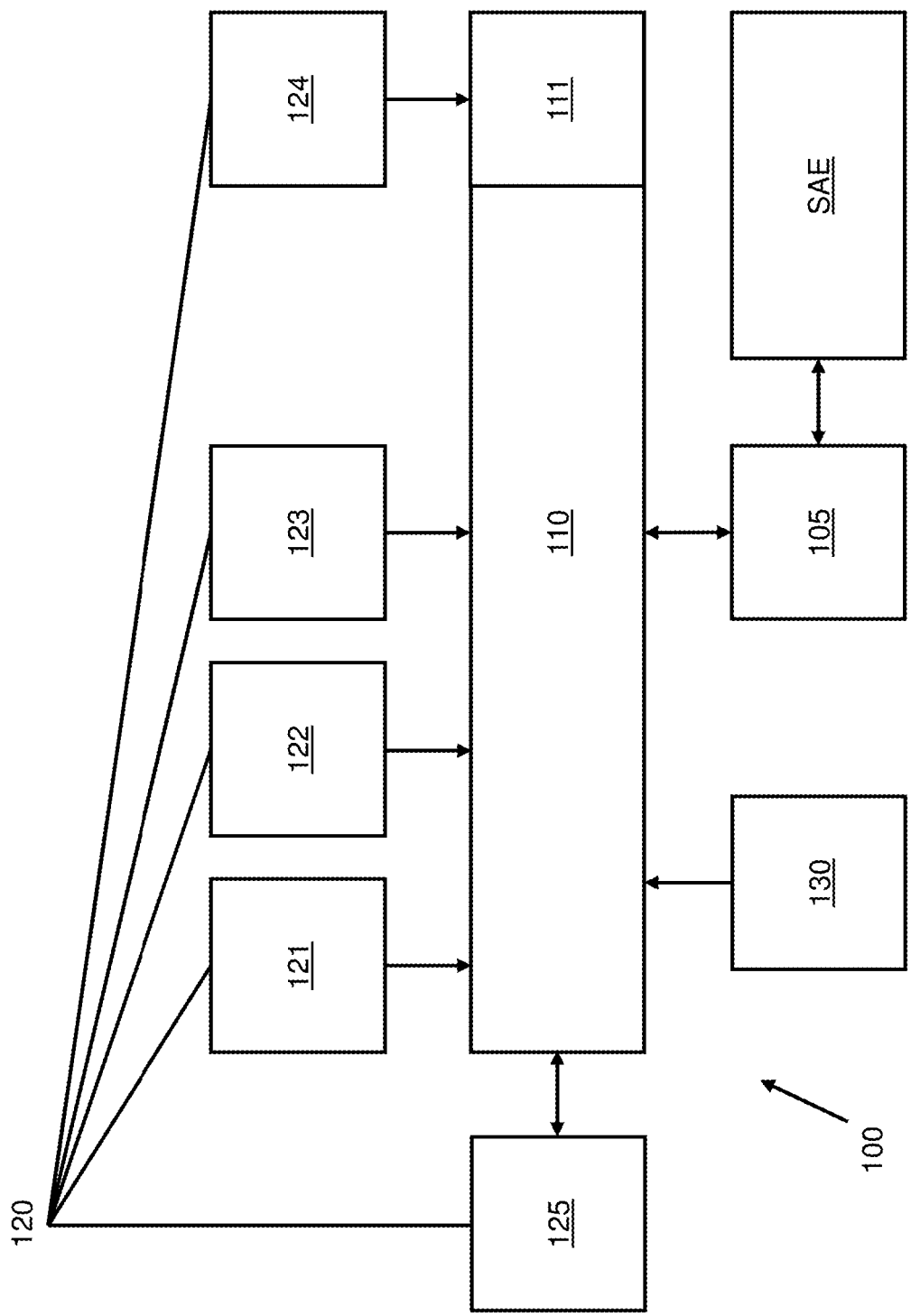
FIG. 1 depicts an exemplary embodiment of a dynamic allocation system for real-time scheduling reallocation.

FIG. 1 depicts an exemplary embodiment of DA system 100 for real-time predictive scheduling. The DA system 100 includes a Dynamic Allocation Engine (DAE) 110 having multiple scheduling inputs 120 used to modify a preexisting schedule 105 to reallocate CSRs. In certain embodiments, schedule 105 is generated and transmitted to DA system by a separate scheduling analytics engine (SAE), which may use at least some of the same scheduling inputs 120 as DAE 110. In certain embodiments, the original schedule may be generated by other means.

The DAE 110 includes a set of analytics rules 111 used to analyze all information received by DAE 110. The analytics rules 111 may include minimum and maximum CSR staffing, the reallocation threshold for acceptable differences between forecast and actual work volume and type, skill requirements for CSRs, experience level requirements for CSRs, and authority level requirements for CSRs. The analytics rules 111 may be time-variable or -invariable rules, and may include exceptions and the conditions for exceptions. The analytics rules 111 may be user-generated or pre-generated, and may be updated by users. The analytics rules 111 may be a software program or programs, or a separate file or files executed by a software program.

For example, analytics rules 111 for a credit card company may forbid reallocation of more than 10% of the scheduled CSRs for a given period. Complaints about long wait times during peak hours may necessitate alteration to analytics rules 111 for peak times, resulting in increasing the allowed reallocation to 20% of the CSR staff. By contrast, analytics rules 111 for an agricultural supply company may not require DAE analysis between 6 pm PST and 6 am EST due to no overnight CSR availability. If the company began overnight CSR availability, analytics rules 111 would require alteration to provide DAE analysis between 6 pm PST and 6 am EST.

The DAE 110 may reassign CSRs to specific channels and queues based on skill and authority levels. By way of non-limiting example, a supervisory CSR currently assigned to a first channel, with extensive experience in a particular area, may be reassigned to a second channel dealing with that particular area. However, if doing so would eliminate the only supervisory CSR for the first channel, a violation of analytics rules 111, a non-supervisory CSR with less experience may be selected for reassignment to the second channel.

The scheduling inputs 120 provide DAE 110 with input information for reallocating CSR distribution. At least one CSR input 121 provides information for identification of CSRs, along with their respective skills and work schedules. By way of non-limiting example, such information may include that a first CSR is a personal services CSR scheduled to work from 11 am to 7 pm EST Tuesday through Saturday, while a second CSR is a commercial services supervisory CSR scheduled to work from 8 am to 4 pm PST Monday through Friday.

At least one workload update input 122 provides a real-time input of workload and related information. Such information can include the volume and type of work generated for a given period, the work throughput for a given period, and any work backlog for a given period. Backlog can be considered as, but is not limited to, a number or percentage of waiting customers as compared to CSR, an average or median wait time, or any combination thereof. At least one CSR update input 123 provides updates for CSR availability, such as a CSR absence, shift change, or a decrease or increase in available CSRs. At least one rules update input 124 allows direct updates to analytics rules 111 under a user's control, while at least one engine update input 125 allows direct updates to DAE 110.

The DAE 110 utilizes information received from CSR input 121, workload update input 122, and CSR update input 123 to periodically calculate the current level of work volume and type, and compare it to the forecast volume and type, as well as the available CSRs from schedule 105. If the difference between forecast and current volume and type of work is does not extend beyond a reallocation threshold found in analytics rules 111, then no action is necessary and CSRs continue to work according to initial schedule 105. If the current volume and type of work extends beyond the reallocation threshold, then DAE 110 utilizes analytics rules 111 and information from CSR input 121, workload update input 122, and CSR update input 123 to reallocate CSRs and update schedule 105.

Note that in certain embodiments, such reallocation may occur due to underutilization of available CSRs because of low workload as well as overutilization of available CSRs because of high workload. In such a case, the reallocation threshold is a range. If the current volume and type of work extends beyond the reallocation threshold, in either the upper or lower boundaries of the range, then DAE 110 utilizes analytics rules 111 and information from CSR input 121, workload update input 122, and CSR update input 123 to reallocate CSRs and update schedule 105.

Optionally, DAE 110 also performs feedback calculations of the success of reallocation based on changes in backlogs and work distribution. These calculations may be based on projected or actual changes. These calculations may be provided to rules update input 124 and engine update input 125 to allow rules update input 124 and engine update input 125 to modify analytics rules 111 and DAE 110, respectively, based on the efficacy of updated schedule 105. If the feedback calculations are below a certain feedback threshold, DAE 110 may iteratively reallocate CSRs until the feedback threshold is reached or exceeded. If DAE 110 reaches an iteration threshold before reaching or exceeding the feedback threshold, DAE 110 may transmit an alert to a user requiring manual intervention through a user override.

The user override 130 allows a user, such as, but not limited to, a manager or other staff member to operate DAE 110 to manually reallocate CSRs in schedule 105. Manual reallocation may occur due to the inability of DAE 110 to reach or exceed the feedback threshold in a given number of iterations, or due to a manager electing to make a manual reallocation in anticipation or response to a workflow change. After manual reallocation, DAE 110 may wait for a user- or DAE-designated interim before comparing the difference between forecast and current volume and type of work to the reallocation threshold.

Figure 2A:
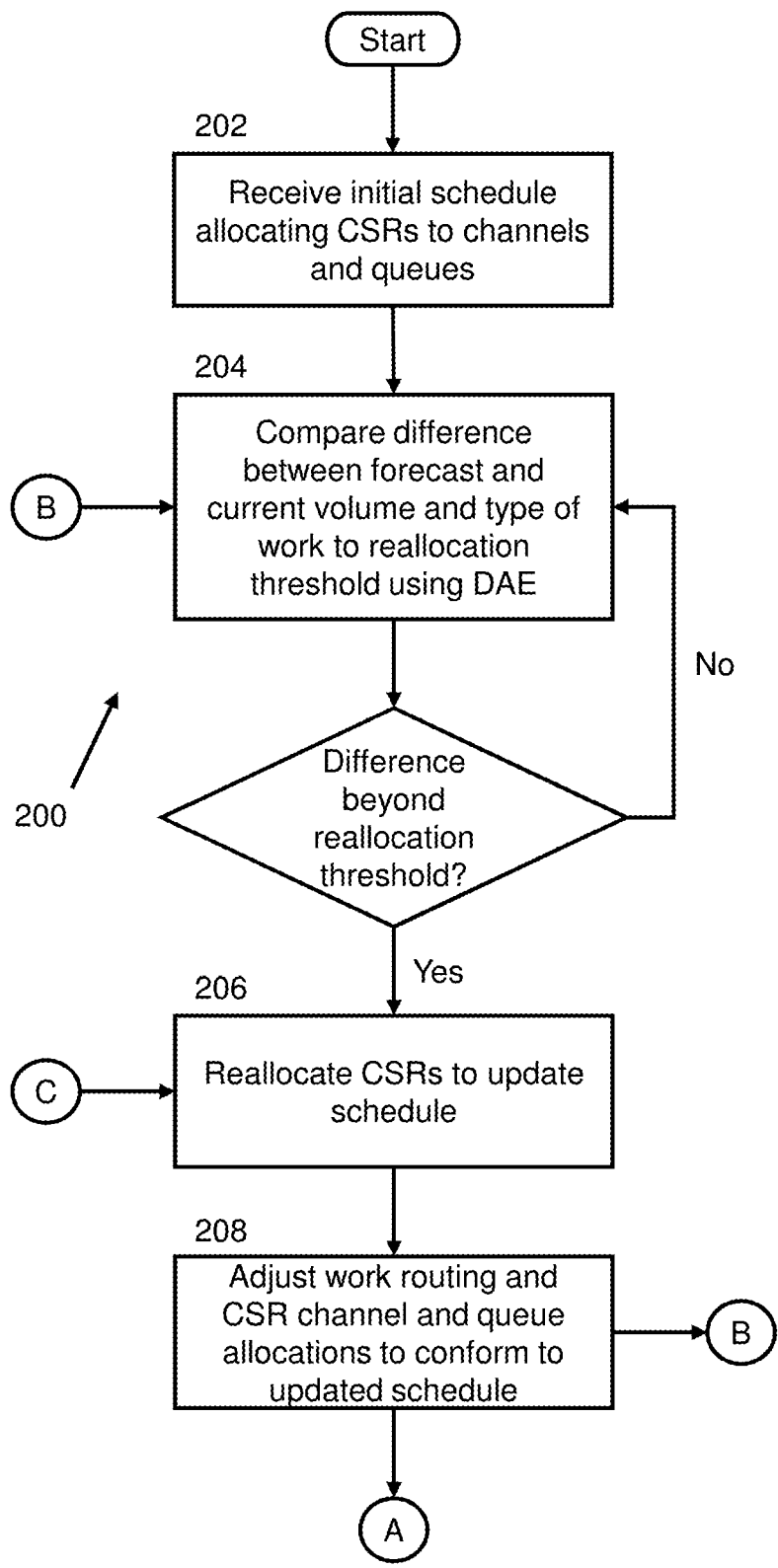
FIGS. 2a and 2b depict a flowchart of an exemplary embodiment of a method for real-time scheduling reallocation.
Figure 2B:
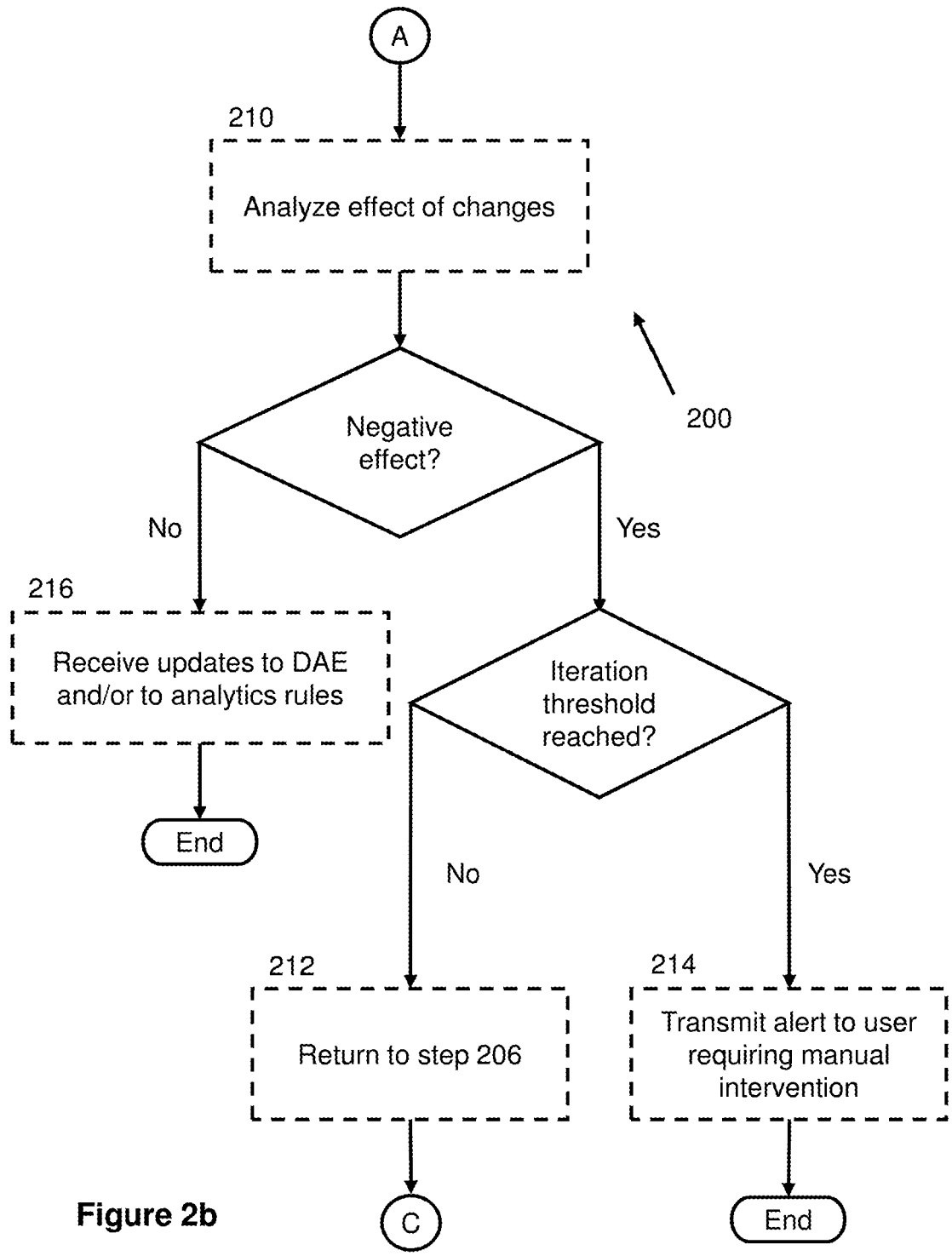

FIGS. 2a and 2b depict a flowchart of an exemplary embodiment of method 200 for real-time predictive scheduling.

Referring to FIG. 2a, in step 202, the DA system receives a schedule. This initial schedule allocates CSRs to channels and queues based on analytics rules as well as the forecast work patterns and information on CSR skills and shift patterns.

In step 204, the DAE monitors adherence to the current schedule by comparing the difference between forecast and current volume and type of work to the reallocation threshold at predetermined intervals. This calculation is based on the schedule and information received from at least one workload update input and at least one CSR update input. The current schedule monitored may be the initial schedule or an updated schedule including reallocated CSRs. The predetermined intervals may be determined and input by a user or may be part of the analytics rules.

In optional step 206, if the difference extends beyond the reallocation threshold, the DA system reallocates CSRs to update the schedule. The updated schedule is based on the initial schedule and information received from workload update and CSR update inputs.

In optional step 208, the DA system automatically adjusts work routing, and CSR channel and queue allocations to conform to the updated schedule and returns to step 204 to monitor adherence to the updated schedule.

In optional step 210, the DA system analyzes the effect of the changes made to create the updated schedule by calculating feedback based on changes in backlogs and work distribution.

Referring to FIG. 2b, in optional step 212, if the feedback indicates that the updated schedule has had a negative effect on work distribution, the DA system returns to step 206 and recalculates an updated schedule. The negative effect may be determined by comparing feedback calculations to a feedback threshold, and determining a negative effect is the feedback calculations are below a feedback threshold.

in optional step 214, if the DAE reaches an iteration threshold before reaching or exceeding the feedback threshold, the DAE transmits an alert to a user requiring manual intervention through a user override.

In optional step 216, the DA system receives updates to the DAE and/or to the analytics rules through at least one engine update input and/or at least one rules update input, respectively.

Figure 3:
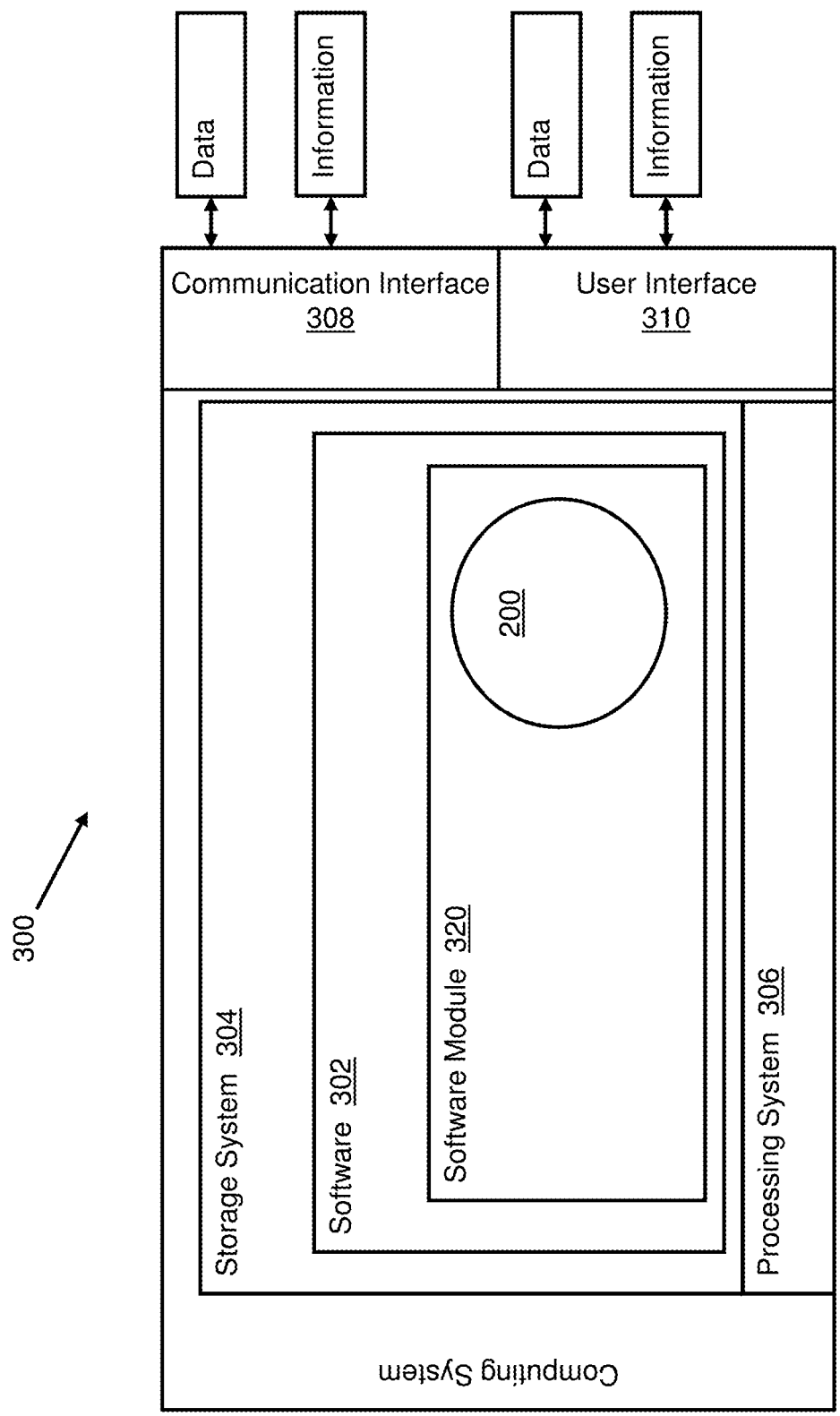
FIG. 3 depicts an exemplary embodiment of a system for real-time scheduling reallocation.

FIG. 3 depicts an exemplary embodiment of system 300 for organizing and integrating electronic customer service resources using DA system 100.

The system 300 is generally a computing system that includes a processing system 306, a storage system 304, software 302, a communication interface 308, and a user interface 310. The processing system 306 loads and executes software 302 from the storage system 304, including a software module 320. When executed by computing system 300, software module 320 directs the processing system 306 to operate as described in herein in further detail in accordance with the method 200.

The computing system 300 includes a software module 320 for performing the function of DA system 100. Although computing system 300 as depicted in FIG. 3 includes one software module 320 in the present example, it should be understood that more modules could provide the same operation. Similarly, while the description as provided herein refers to a computing system 300 and a processing system 306, it is to be recognized that implementations of such systems can be performed using one or more processors, which may be communicatively connected, and such implementations are considered to be within the scope of the description. It is also contemplated that these components of computing system 300 may be operating in a number of physical locations.

The processing system 306 can comprise a microprocessor and other circuitry that retrieves and executes software 302 from storage system 304. The processing system 306 can be implemented within a single processing device but can also be distributed across multiple processing devices or sub-systems that cooperate in existing program instructions. Examples of processing systems 306 include general purpose central processing units, application specific processors, and logic devices, as well as any other type of processing device, combinations of processing devices, or variations thereof.

The storage system 304 can comprise any storage media readable by processing system 306, and capable of storing software 302. The storage system 304 can include volatile and non-volatile, removable and non-removable media implemented in any method or technology for storage of information, such as computer readable instructions, data structures, program modules, or other information. The storage system 304 can be implemented as a single storage device but may also be implemented across multiple storage devices or sub-systems. The storage system 304 can further include additional elements, such a controller capable of communicating with the processing system 306.

Examples of storage media include random access memory, read only memory, magnetic discs, optical discs, flash memory, virtual memory, and non-virtual memory, magnetic sets, magnetic tape, magnetic disc storage or other magnetic storage devices, or any other medium which can be used to store the desired information and that may be accessed by an instruction execution system, as well as any combination or variation thereof, or any other type of storage medium. In some implementations, the storage media can be a non-transitory storage media. In some implementations, at least a portion of the storage media may be transitory. Storage media may be internal or external to system 300.

As described in further detail herein, computing system 300 receives and transmits data through communication interface 308. The data can include verbal or textual communications to or from a customer and details about a request, a work order, a back-office task, or another set of data that will necessitate an interaction between a customer and the CSR. In embodiments, the communication interface 308 also operates to send and/or receive information, such as, but not limited to, information to/from other systems to which computing system 300 is communicatively connected, and to receive and process information from system inputs 120, as described in greater detail above. Such information can include input related to initial and updated workload and CSR availability, updates to DAE 110, and/or updates to analytics rules 111.

The user interface 310 can include one or more system inputs 120, a mouse, a keyboard, a voice input device, a touch input device for receiving a gesture from a user, a motion input device for detecting non-touch gestures and other motions by a user, and/or other comparable input devices and associated processing elements capable of receiving user input from a user. Output devices such as a video display or graphical display can display documents or another interface further associated with embodiments of the system and method as disclosed herein. Speakers, printers, haptic devices and other types of output devices may also be included in the user interface 310. CSRs or other staff can communicate with computing system 300 through the user interface 310 in order to view documents, enter or receive data or information, enter information into system inputs 120, manage an interaction or back-office task, or any number of other tasks the CSR or other staff may want to complete with computing system 300.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims.

What is claimed is:

1. A system for predictive and real-time resource allocation and work routing, the system comprising:

a customer engagement center for receiving workloads and allocating work tasks in the workloads to one of a plurality of work queues, the customer engagement center comprising:
- a communication interface;
- a user interface;
- a source of real-time workload update inputs each real-time workload update input including a plurality of work items, each work item being a work item data structure, each work item data structure comprising a work identification and a type of work associated with the work identification;
- a source of real-time customer service representative update inputs, the real-time customer service representative update inputs including one or more customer service representative schedules, the customer service representative schedule being a customer service schedule data structure, each customer service schedule data structure comprising an identification of a customer service representative a set of customer skills for the customer service representative, and a customer service shift schedule for the customer service representative;
- a dynamic allocation engine;
- a scheduling analytics engine;
- the plurality of work queues, wherein the source of real-time workload update inputs and the source of real-time customer service representative update inputs are operably coupled to the communication interface, further wherein the dynamic allocation engine, the scheduling analytics engine, the plurality of work queues, and a processor are operably coupled to the communication interface, further wherein the dynamic allocation engine and the scheduling analytics engine is operably connected to the user interface which is operably connected to a customer engagement center desktop;
- the processor, and
- a memory comprising computer readable instructions that upon execution by the processor causes the system to:
  - receive, at the dynamic allocation engine, an initial schedule through the communication interface, the initial schedule allocating each customer service representative schedule to one of the plurality of work queues, wherein the initial schedule allocates each customer service representative schedule based on a forecast work pattern, customer service skills associated with each customer service representative schedule and the customer service shift schedules associated with the customer service representative schedules;
  - receive, at the dynamic allocation engine through the communication interface, real-time workload update inputs;
  - receive, at t the dynamic allocation engine through the communication interface, real-time customer service representative schedule update inputs, the real-time customer service representative schedule update inputs including an update to the set of customer skills for the customer service representative or an update to the customer service shift schedule for the customer service representative;
  - monitor, by the dynamic allocation engine, adherence of a current workload to the initial schedule by calculating a difference between the forecast work pattern and the current workload based on the work identifications associated with each work data structure associated with the current workload and the types of work associated with each work item data structure and the real-time customer service representative schedule update inputs;
  - perform by the dynamic allocation engine, a reallocation through the user interface when the difference between the forecast work pattern and the current workload is outside of a threshold range provided by a set of analytics rules, the reallocation including:
    - generate an updated schedule for allocating each customer service representative identification to one of the plurality of work queues based on the initial schedule, the current workload, the real-time customer service representative schedule update inputs;
    - reallocate, through the user interface, the customer service schedule data structures to one of the plurality of work queues based on the updated schedule; and
    - adjust routing, through the user interface, of the real-time workload update inputs to the plurality of work queues based on the updated schedule;
  - generate a set of feedback for the updated schedule, the set of feedback including changes in backlogs and changes in work distribution;
  - generate an effect of the updated schedule based on the set of feedback; and
  - perform, by the dynamic allocation engine, the reallocation through the user interface when the effect of the updated schedule is below a feedback threshold.

2. The system of claim 1, wherein the processor further causes the system to repeat monitor adherence of the current workload to the initial schedule by calculating a difference between the forecast work pattern and the current workload until difference between the forecast work pattern and the current workload is outside of the threshold range.

3. The system of claim 2, wherein monitor adherence of the current workload to the initial schedule occurs at predetermined intervals.

4. The system of claim 3, wherein the predetermined intervals are input by a user.

5. The system of claim 3, wherein the predetermined intervals are part of the analytics rules.

6. The system of claim 1, wherein the processor further causes the system to transmit an alert to a user requiring manual intervention through a user override if the dynamic allocation engine reaches an iteration threshold before being below the feedback threshold.

7. The system of claim 1, wherein the processor further causes the system to receive updates to the dynamic allocation engine through at least one engine update input.

8. The system of claim 1, wherein the processor further causes the system to receive updates to the analytics rules through at least one rules update input.

* * * * *